United States Patent [19]

Kirk

[11] 4,126,152

[45] Nov. 21, 1978

[54] PRESSURE REPRODUCING RELAY

[75] Inventor: David B. Kirk, Hilltown, Pa.

[73] Assignee: Moore Products Co., Spring House, Pa.

[21] Appl. No.: 789,662

[22] Filed: Apr. 21, 1977

[51] Int. Cl.² ............................................ G05D 16/00
[52] U.S. Cl. .................................. 137/85; 137/627.5; 137/596.18; 251/64
[58] Field of Search ........... 137/85, 86, 627.5, 596.18, 137/596.12, 514; 251/282, 64

[56] References Cited

U.S. PATENT DOCUMENTS

| 2,726,680 | 12/1955 | Baines | 137/596.12 X |
| 3,156,250 | 11/1964 | Lum | 137/514 X |
| 3,304,048 | 2/1967 | Roberts | 251/282 X |
| 3,417,773 | 12/1968 | Hatch | 137/85 |

Primary Examiner—Alan Cohan
Attorney, Agent, or Firm—Zachary T. Wobensmith, 2nd; Zachary T. Wobensmith, III

[57] ABSTRACT

A fluid pressure reproducing relay is described having a high order of accuracy in matching the output pressure to the loading pressure under steady state conditions, having a large flow capacity for both supply and exhaust and which is small in size for its capacity, the relay having a resilient rolling seal with a vented seating arrangement that requires no clamping, having a stabilizing mass loosely attached to a force balance diaphragm assembly and in which a balanced area supply plunger is employed.

7 Claims, 6 Drawing Figures

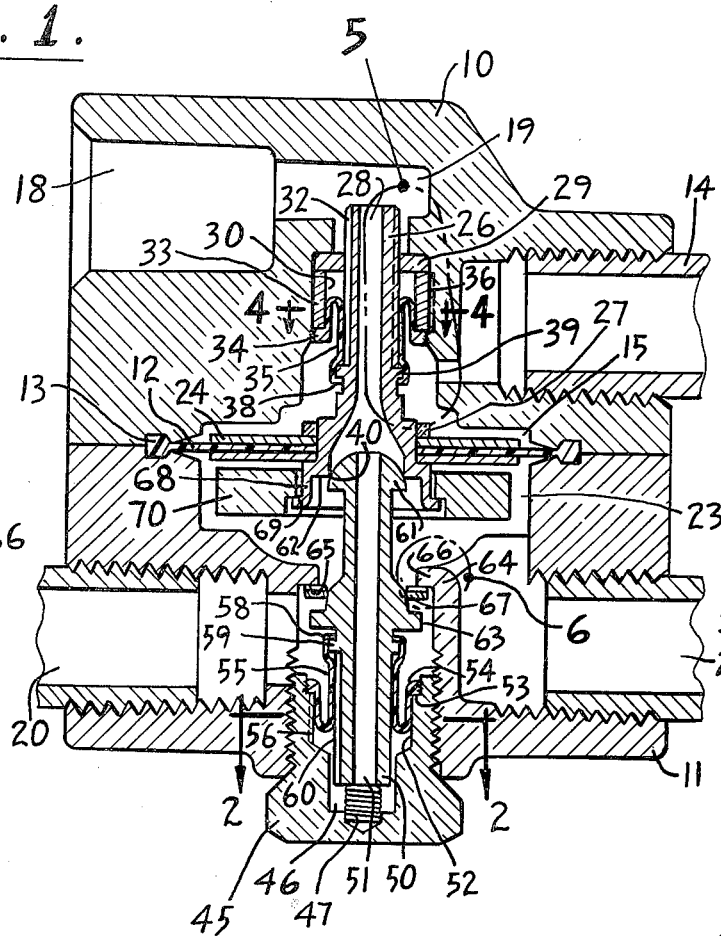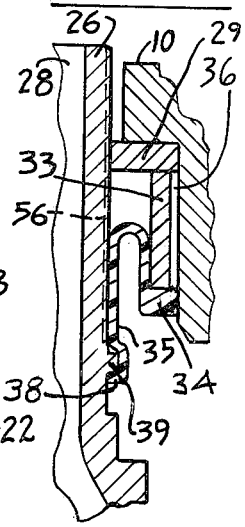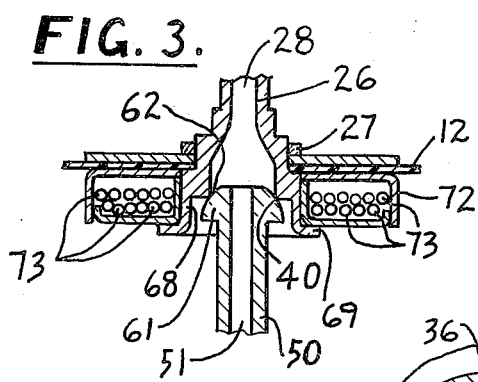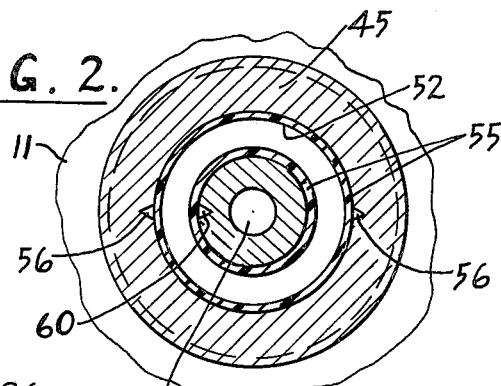

PRESSURE REPRODUCING RELAY

BACKGROUND OF THE INVENTION

1. FIELD OF THE INVENTION

This invention relates to fluid pressure reproducing relays.

2. DESCRIPTION OF THE PRIOR ART

Various fluid pressure reproducing relays of the force balance type have heretofore been proposed including those of Thompson et al., U.S. Pat. No. 2,312,201, and Johnston, U.S. Pat. No. 3,134,260.

Some of the relays heretofore available have had provisions for amplification but relays of the one-to-one type have a wide range of usefulness.

SUMMARY OF THE INVENTION

In accordance with the invention a fluid pressure reproducing relay is provided having a high order of accuracy in matching the output pressure to the loading pressure under steady state conditions, having a large flow capacity for both supply and exhaust, which is compact and smaller in size for its capacity than many relays now available, which has improved sealing provisions employing upper and lower resilient rolling seals with a vented seating arrangement that requires no clamping, having a stabilizing mass loosely attached to a force balance diaphragm assembly, and in which a balance area supply plunger is employed so that the pressure effective on the supply seat is balanced by the pressure effective on the lower rolling seal and similarly the pressure effective on the exhaust seat is balanced by the pressure effective on the upper rolling seal.

It is the principal object of the invention to provide a pressure reproducing relay having a high order of accuracy in matching the output pressure to the loading pressure under steady state conditions.

It is a further object of the invention to provide a pressure reproducing relay having a large flow capacity both for the supply and for the exhaust.

It is a further object of the invention to provide a pressure reproducing relay having small size for its capacity.

It is a further object of the invention to provide a pressure reproducing relay having improved resilient rolling seals with a vented seating.

It is a further object of the invention to provide a pressure reproducing relay employing a diaphragm assembly and which includes a stabilizing mass attached to the diaphragm assembly.

It is a further object of the invention to provide a pressure reproducing relay having a supply plunger with a balanced area through the use of an internal passageway.

Other objects and advantageous features will be apparent from the description and claims.

BRIEF DESCRIPTION OF THE DRAWINGS

The nature and characteristic features of the invention will be more readily understood from the following description taken in connection with the accompanying drawings forming part hereof, in which:

FIG. 1 is a vertical central sectional view of a preferred embodiment of a pressure reproducing relay in accordance with the invention;

FIG. 2 is a horizontal sectional view, enlarged, taken approximately on the line 2—2 of FIG. 1;

FIG. 3 is a fragmentary vertical sectional view showing a modified form of stabilizing mass;

FIG. 4 is a horizontal sectional view, enlarged, taken approximately on the line 4—4 of FIG. 1;

FIG. 5 is an enlarged fragmentary sectional view taken at the location 5 of FIG. 1; and FIG. 6 is a fragmentary sectional view taken at the location 6 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, the pressure reproducing relay in accordance with the invention includes an upper body section 10 and a lower body section 11 secured together in any desired manner with a resilient diaphragm 12 interposed therebetween. The diaphragm 12 can be provided with a peripheral ring 13 for holding it in clamped relation between the body sections 10 and 11. The diaphragm 12 is preferably very resilient so as to introduce a minimum of elastic effect into the system.

The upper body section 10 has a loading fluid pressure connection 14 communicating with a chamber 15 above the diaphragm 12, for the application of the input or loading pressure downwardly on the diaphragm 12.

The upper body section 10 has a vent connection 18, communicating with the atmosphere, which communicates with a bore 19 alined with the chamber 15 but sealed therefrom as hereinafter explained.

The lower body section 11 has a supply connection 20 which is connected to any suitable source of fluid, preferably air under pressure, and which is to be delivered.

The lower body section 11 has a fluid delivery connection 22 which is in communication with a chamber 23 below the diaphragm 12 for the application of the delivered pressure upwardly on the diaphragm 12 in opposition to the downward pressure on the diaphragm 12.

The diaphragm 12 is clamped between clamping plates 24 and the diaphragm 12 and plates 24 are secured to an exhaust tube 26 by a clamping ring 27. The tube 26 has a central bore 28 communicating with the vent 18.

The exhaust tube 26 is guided by a ring 29 within a bore 30 aligned with the bore 19 and the chamber 15 and has one or more longitudinal grooves 32 providing communication between the vent connection 18 and the area above an annular enlargement 30 on the tube 26 on which the sealing sleeve 35 hereinafter described rolls.

Within the upper end of the bore 30 a guide retainer ring 33 is provided the lower end of which serves as a stop for engagement therewith of an end enlargement 34 of the input chamber sealing sleeve 35. The sleeve 35 is cylindrical, of resilient material such as rubber or the like, is turned back on itself and is adapted to engage and roll along the interior of the retainer ring 33 and the exterior of the exhaust tube 26. The retainer ring 33 has one or more grooves 36 for preventing fluid pressure build up between the sleeve 35 and the ring 33.

The sleeve 35 has an end 38 in resilient engagement with and over the annular enlargement 39 on the exterior of the exhaust tube 26.

The exhaust tube 26, in the interior thereof and at the lower end of the bore 28 has an annular seating corner 40.

The lower body section 11 has threaded therein a valve plunger retaining plug 45. The plug 45 has a bore 46 within which a light plunger spring 47 is carried, the spring 47 engaging the lower end of a valve plunger 50. The valve plunger 50 has a central bore 51 communicating with the bore 46 and with the bore 28 in the exhaust tube 26.

The plug 45 has a bore 52 terminating at a shoulder 53 over which an end enlargement 54 of a supply sealing sleeve 55 is engaged. The sleeve 55 is similar to the sleeve 35 and is adapted to engage and roll along the bore 52. The bore 52 has one or more grooves 56 for venting the area on the bore 52 along which the sleeve 55 rolls.

The sleeve 55 has an end 58 in resilient engagement with and over an annular enlargement 59 on the valve plunger 50.

The valve plunger 50 on the exterior thereof, and extending to the enlargement 59 has one or more grooves 60 for venting the low pressure side of the sleeve 55 through the bore 52, the bore 46 and the bores 51 and 28 to the vent 18.

The valve plunger 50 has a head 61 preferably with an exterior spherical surface 62 for engagement with the seating corner 40.

The valve plunger 50 has a rim 63 and thereabove a valve seating surface 64 for engagement with a supply seat disc 65 carried by a wall 66. The wall 66 separates a supply chamber 67, to which the supply connection 20 is connected, from the output chamber 23.

The supply seat disc 65 on its face adjacent the wall 66 has a groove 65a providing a bypass passageway between the supply chamber 67 and the output chamber 23.

The exhaust tube 26 has a downward extension 68 with an outwardly extending rim 69. A stabilizing mass 70, preferably of metal, is slidably mounted on the extension 68, is limited as to its upward movement by the lower diaphragm clamping plate 24 and as to its downward movement by the rim 69.

A modified form of stabilizing mass is shown in FIG. 3 and comprises a housing 72 clamped between the diaphragm 12 and the rim 69 and containing but not being filled with a plurality of balls 73 of metal, such as steel or lead.

The mode of operation will not be pointed out.

The supply connection 20 is connected to a suitable source of fluid, such as air and the delivery connection 22 is connected to the place to which fluid at controlled pressure is to be delivered.

The input pressure connection 14 is supplied with the pressure which is to be matched for delivery through the delivery connection 22.

The chamber 27 provides for the application of an input or control pressure for urging the diaphragm 12 in a downward direction. The chamber 23 provides a balancing chamber for the output pressure.

The output pressure effective through the fluid delivery connection is caused to equal the input or control pressure through the action of the valve plunger 50 in conjunction with the supply seating members 64 and 65 and the exhaust seating members 40 and 62 in a well known manner.

It will be noted that the diaphragm 12 by reason of its resiliency introduces a minimum of elastic effect into the force balance system. In the steady state condition, i.e., when no fluid is flowing through the delivery connection 22, the exhaust seating members are slightly separated to vent the fluid admitted by the bypass groove 65a and the force balance diaphragm 12 floats free of the valve plunger 50 and thus is not influenced by frictional and other forces inherent in the operation of the plunger 50. The diaphragm 12 also has equal effective areas subjected both to the input or control pressure and to the output pressure because the effective area of the sealing sleeve 35 equals the area of the exhaust seat at the seating corner 40. These factors contribute to high accuracy of pressure matching.

It should also be noted that the diaphragm 12, preferably of single ply to enhance its resilience, and with balanced pressures on opposite sides minimizes stresses in the diaphragm 12 thus promoting maximum resilience.

Large flow capacity is obtained by the use of large diameter valve seats with the resilient diaphragm 12 providing relatively large displacement for small pressure changes. By balancing the effective area of the supply seating members 64 and 65 with respect to both the effective area of the sealing sleeve 55 and the area of the exhaust port formed by the corner 40 the force required to open the supply seat is very small, sufficient force to urge the supply port to closed condition being supplied by the light spring 47.

The small residual forces effective on the valve plunger 50 render it advisable that the plunger 50 be balanced with respect to exhaust port pressures. The central bore 51 connected to the vent 18, insures that equal pressures are applied to both ends of the plunger 50 thus there will be no unbalanced forces tending to open the supply port during normal exhaust port operation. The supply port and exhaust port are of equal area and this keeps the operating forces effective on the plunger 50 to a minimum and independent of the level of the pressure in the output chamber 23.

The construction of the plunger 50 and the supply seat disc 65 is particularly adapted to providing equal supply and exhaust port areas while permitting the removal of the valve plunger 50 from the lower body section 11 by removal of the plug 45.

The sealing sleeves 35 and 55 operate as rolling seals and do not require auxiliary clamping members. The seals are effected through diametrical interference on both the internal and external diameters at their end enlargements 34, 39, 54 and 59.

The surfaces on the low pressure sides of the sleeves 35 and 55 immediately adjacent the terminal ends are vented so that there are strong radial forces developed for sealing the terminal ends against the adjacent seating surfaces. In the absence of such vents, the axial forces would tend to pull the terminal ends of the sleeves 35 and 55 away from their seating locations.

Stability in a force balance pressure reproducing relay of this type is most easily achieved by making the sensing element stiff and by making the diameters of both the supply and exhaust ports small to limit their response to diaphragm motion. But, it has been heretofore observed that these factors operate detrimentally with respect to accuracy and flow capacity. To achieve high accuracy and flow capacity it was necessary to employ a resilient diaphragm 12 and use large diameter ports as heretofore referred to.

Stability could have been achieved by introducing rubbing friction on either the plunger 50 or diaphragm 12 or both, but such rubbing friction achieves stability at the expense of accuracy since the forces inherent in such friction destroy the perfect balance desired between the input and the output pressures.

In place of rubbing friction, an energy absorbing means to achieve stability is employed consisting of a slidable mass 70, loosely attached to the exhaust tube 26 or of the plurality of loose balls 73 in the housing 72. Friction between the mass 70 or 73 and the diaphragm 12 absorbs energy of any incipient oscillation and thereby damps it. However, when steady state is achieved, the mass 70 or 73, not being in contact with anything other than the diaphragm itself, creates no frictional force. The dead weight of the mass is easily balanced by the resilient force of the diaphragm 12.

I claim:

1. In a pneumatic relay for producing a delivered fluid pressure in response to an applied condition,
a housing,
a connection to said housing from a source of fluid pressure,
a fluid delivery connection connected to said housing,
a connection to said housing for applying therein a variable condition,
a first movable member responsive to said applied condition and to the pressure at said delivery connection,
a second movable member comprising valve means controlled by said first movable member for supply and exhaust of fluid pressure to and from said fluid delivery connection,
spaced coaxial cylindrical surfaces one of which is in said housing and the other of which is on one of said movable members defining an annular space within said housing,
a sealing element in said housing separating said space into two regions subject to different fluid pressures,
said sealing element having a tubular shape with portions for rolling contact with said cylindrical surfaces,
said sealing element having an end portion which is of increased thickness in cross section for pressure-tight engagement with a stepped portion of the adjacent cylindrical surface,
a fluid passageway extending between said end portion and said region with the lower pressure for venting the interface between said element and adjacent cylindrical surface to said region with the lower pressure.

2. A pneumatic relay as defined in claim 1 in which said stepped portion comprises an annular ring portion on the inner of said coaxial surfaces, and
in which said fluid passageway comprises grooves in said inner coaxial surface,
said grooves terminating at said ring.

3. A pneumatic relay as defined in claim 1 in which both said end portions are of increased thickness in cross section, and
venting fluid passageways are provided extending from said end portions.

4. A pneumatic relay as defined in claim 1 in which damping means is provided for said first movable member comprising a mass loosely supported by said first movable member for limited movement for absorbing energy derived from movement of said member 5. A pneumatic relay as defined in claim 4 in which said damping means comprises a weight longitudinally axially movable with respect to said movable member.

6. A pneumatic relay as defined in claim 4 in which said movable member has an extension with a rim, and
said damping means comprises a weight slidably carried on said extension and limited by said rim in one direction of movement.

7. A pneumatic relay as defined in claim 4 in which said damping means comprises a receptacle and a plurality of weights movable within said receptacle.

* * * * *

UNITED STATES PATENT OFFICE
CERTIFICATE OF CORRECTION

Patent No. 4,126,152         Dated  November 21, 1978

Inventor(s) David B. Kirk

It is certified that error appears in the above-identified patent and that said Letters Patent are hereby corrected as shown below:

Column 3,

Line 53, after "will", "not" should be - now - .

Signed and Sealed this

Twenty-seventh Day of February 1979

[SEAL]

Attest:

RUTH C. MASON
Attesting Officer

DONALD W. BANNER
Commissioner of Patents and Trademarks